No. 720,859. PATENTED FEB. 17, 1903.
B. T. TRUEBLOOD.
SPECTACLES OR EYEGLASSES.
APPLICATION FILED JUNE 16, 1902.
NO MODEL.

Witnesses
Geo. Ackman.
Chas. S. Hyer.

Inventor
Barclay T. Trueblood
By Victor J. Evans
Attorney

UNITED STATES PATENT OFFICE.

BARCLAY T. TRUEBLOOD, OF O'NEILL, NEBRASKA.

SPECTACLES OR EYEGLASSES.

SPECIFICATION forming part of Letters Patent No. 720,859, dated February 17, 1903.

Application filed June 16, 1902. Serial No. 111,970. (No model.)

*To all whom it may concern:*

Be it known that I, BARCLAY T. TRUEBLOOD, a citizen of the United States, residing at O'Neill, in the county of Holt and State of Nebraska, have invented new and useful Improvements in Spectacles or Eyeglasses, of which the following is a specification.

My invention relates to new and useful improvements in eyeglasses and spectacles; and its object is to provide a practically invisible rim or frame for each lens, which serves to hold the lens securely to the nose-piece without the necessity of weakening the same by perforating it for the reception of a securing-pin, as in rimless glasses heretofore constructed.

Another object is to employ means whereby the rim may be readily tightened about the lens.

With the above and other objects in view the invention consists in the novel construction and combination of parts hereinafter more fully described and claimed, and illustrated in the accompanying drawings, showing the preferred form of my invention, and in which—

Figure 1:
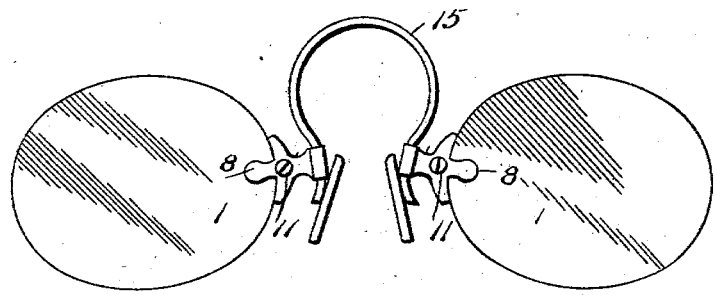
Figure 2:
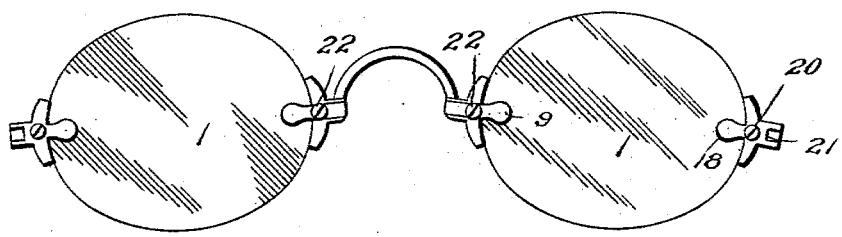
Figure 3:
Figure 4:
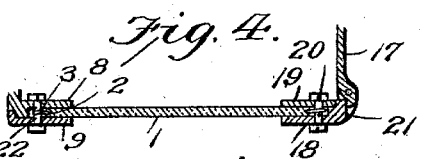
Figure 5:
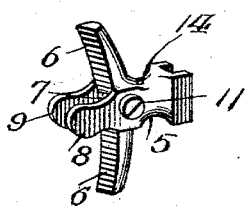
Figure 7:
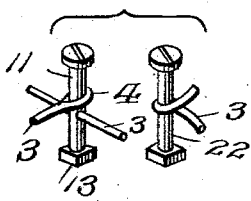
Figure 6:
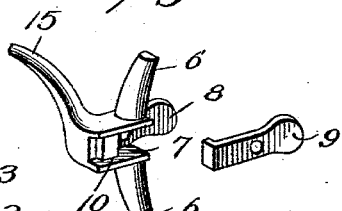

Figure 1 is an elevation of a pair of eyeglasses constructed in accordance with my invention. Fig. 2 is a similar view of a pair of spectacles. Fig. 3 is a section through an eyeglass, the lens being shown partly in plan. Fig. 4 is a section through one lens of a pair of spectacles. Fig. 5 is a perspective view of a mounting for an eyeglass-lens. Fig. 6 is a detail view of a mounting for spectacles, and Fig. 7 shows the tightening-screws of the device.

Referring to the figures by numerals of reference, 1 1 are lenses of a pair of eyeglasses, and these may be bifocal or of ordinary construction. Each lens is provided in its periphery with a groove 2 for the reception of a fine wire 3, which incloses the lens, and is provided at one end with a loop 4. A mounting comprising a block 5, having curved arms 6 extending in opposite directions therefrom, is recessed in one end, as shown at 7, and a fixed clasp member 8 projects forward from one side thereof, while a detachable clasp member 9 is fitted in a groove 10 at the opposite side of said recess 7. The detachable member of the clasp is adapted to clamp one end of the lens 1 upon the fixed member, and a bolt 11 is employed for holding the members clamped upon said lens. This bolt passes through the recess 7, before referred to, and is inclosed by the loop 4 of the wire 3. The other end of the wire passes through an eye 12, formed in bolt 11, and when said bolt is turned by means of a screw-driver or other tool it is obvious that the wire 3 will be wound thereupon until the lens is drawn tightly into position in the mounting. A nut 13 is then screwed upon the bolt and clamps the members 8 and 9 upon the lens and prevents the bolt 11 from turning and unwinding the wire. The free end of the wire is threaded into a small aperture 14 in the mounting and cut off flush with the end thereof. The two mountings are connected by a nose-piece 15 in the usual manner.

A pair of spectacles is constructed in a manner substantially similar to that above described. In addition to the mountings of the nose-piece, however, it is necessary to provide the outer end of each lens with a mounting 16 for the hinged bow 17. The bow is connected to the mounting in the ordinary manner, and the mounting is provided with a fixed clasp member 18 and a detachable member 19, the two being clamped upon opposite sides of the lens 1 by a bolt 20, similar to bolt 11, before described. This bolt passes through a recess 21, formed between the clasp members, and the wire 3 is adapted to be secured thereto, as in the nose-glass construction. A bolt 22 extends through the mounting of the nose-piece, and the wire 3 is looped thereon. It will thus be seen that when the wire is tightened by means of bolt 20 the mounting 16 will be drawn tightly against the lens, and the clasp members 18 and 19 can then be clamped upon said lens.

As the wire 3 is only subjected to tensile strain, it will be seen that a very fine wire can be employed, and as said wire is fitted in a groove in the edge of the lens it will be practically invisible and the glasses will have every appearance of being rimless.

It will be readily understood that with this construction a compound or bifocal lens may be employed. Moreover, as the lens is not weakened by a perforation and as said lens is bound with the wire the glasses constructed in accordance with my invention are rendered as durable as ordinary rim-glasses.

In the foregoing description I have shown the preferred form of my invention; but I do not limit myself thereto, as I am aware that modifications may be made therein without departing from the spirit or sacrificing any of the advantages thereof, and I therefore reserve the right to make all such changes as fairly fall within the scope of the invention.

Having thus fully described the invention, what is claimed as new is—

1. In a device of the character described, the combination with a lens having a grooved periphery, of a mounting, a flexible strip within the groove and inclosing the lens, and a rotatable device extending through a portion of the mounting and engaged by the said flexible strip, the said rotatable device being exteriorly accessible for tightening or loosening the said strip.

2. In a device of the character described, the combination with a lens having a grooved periphery, of a mounting, a flexible strip within the groove and inclosing the lens, a bolt within the mounting engaged by the flexible strip, and adapted when turned to tighten the same, and a clasp upon the mounting adapted to be clamped upon the lens by said bolt.

3. In a device of the character described, the combination with a lens having a grooved periphery; of a mounting, a flexible strip within the groove and inclosing the lens, a bolt within the mounting and having an aperture therein, and a loop at one end of the strip and engaging the bolt, the opposite end of said strip extending into the aperture in the bolt.

4. In a device of the character described, the combination with a lens having a grooved periphery; of a mounting, a flexible strip within the groove and inclosing the lens, means within the mounting for tightening the strip upon the lens, a second mounting having a bow hinged thereto, and a bolt within said second mounting engaged by the flexible strip.

5. In a device of the character described, the combination with a lens having a grooved periphery, of a mounting, clasp members thereon, a bolt for clamping the members upon the lens, a wire within the groove and inclosing the lens, said wire being secured to the bolt and adapted to be tightened thereby.

6. In a device of the character described, the combination with a lens having a grooved periphery, of a mounting, clasp members thereon, a bolt for clamping the members upon the lens, a wire within the groove and inclosing the lens, said wire being secured to the bolt and adapted to be tightened thereby, a second mounting having a bow hinged thereto, clasp members thereto, and a bolt for clamping said members upon the lens, said bolt being engaged by the wire.

In testimony whereof I affix my signature in presence of two witnesses.

BARCLAY T. TRUEBLOOD.

Witnesses:
A. H. CORBETT,
A. B. NEWELL.